Jan. 9, 1962 F. H. FRANTZ ETAL 3,016,002
FLAT BED PRINTER

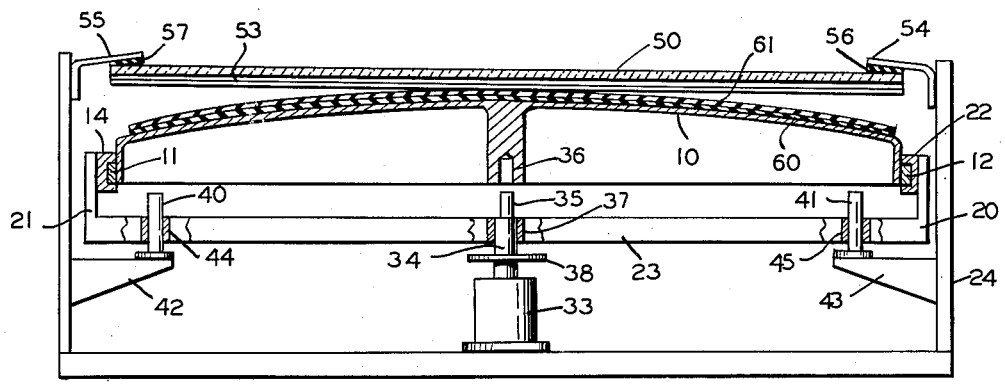

Filed Dec. 28, 1959 3 Sheets-Sheet 2

INVENTORS
FREDERICK H. FRANTZ
CARL A. ACKERMAN
BY
ATTORNEYS 3,016,002
FLAT BED PRINTER
Frederick H. Frantz, Binghamton, N.Y., and Carl A. Ackermann, Brackney, Pa., assignors to General Aniline & Film Corporation, New York, N.Y., a corporation of Delaware
Filed Dec. 28, 1959, Ser. No. 862,211
5 Claims. (Cl. 95—73)

This invention relates to photographic printing devices and, more particularly, to contact printing apparatus for the exposure of light sensitized sheet material.

In reproductions requiring dimensional stability, high accuracy and freedom from imperfections due to creases or foreign matter, use has been made of flat bed contact frames from which the air is exhausted. While such frames, generally known as vacuum frames, in various forms, give satisfactory results, they require constant attention and are cumbersome in handling. The loading and subsequent evacuation of such frames is also a time consuming operation.

It is the primary object of the present invention to provide a contact printing apparatus which possesses all the advantages of flat bed vacuum frames without requiring operation under vacuum.

It is a particular feature of the invention that a contact printing apparatus constructed in accordance therewith is simple to load and requires little time for completing its operation.

Another feature of the invention is that use is made of the relatively elastic quality of tempered glass for progressively covering the arcuate surface of a platen supporting the sensitized material.

Other objects and features will be apparent from the following description of the invention, pointed out in particularity in the appended claims and taken in connection with the accompanying drawings in which:

FIGURE 1, is a front elevational view, partly in cross-section, of the essential working components of the apparatus in rest position;

FIGURE 2, is a view similar to FIGURE 1, with the working parts in closed position;

FIGURE 3, is a fragmentarily enlarged view showing the relationship prior to closure between the transparent plate and print material supporting platen;

FIGURE 4, is a view similar to FIGURE 3, with both the plate and platen in closed position;

Figure 5:
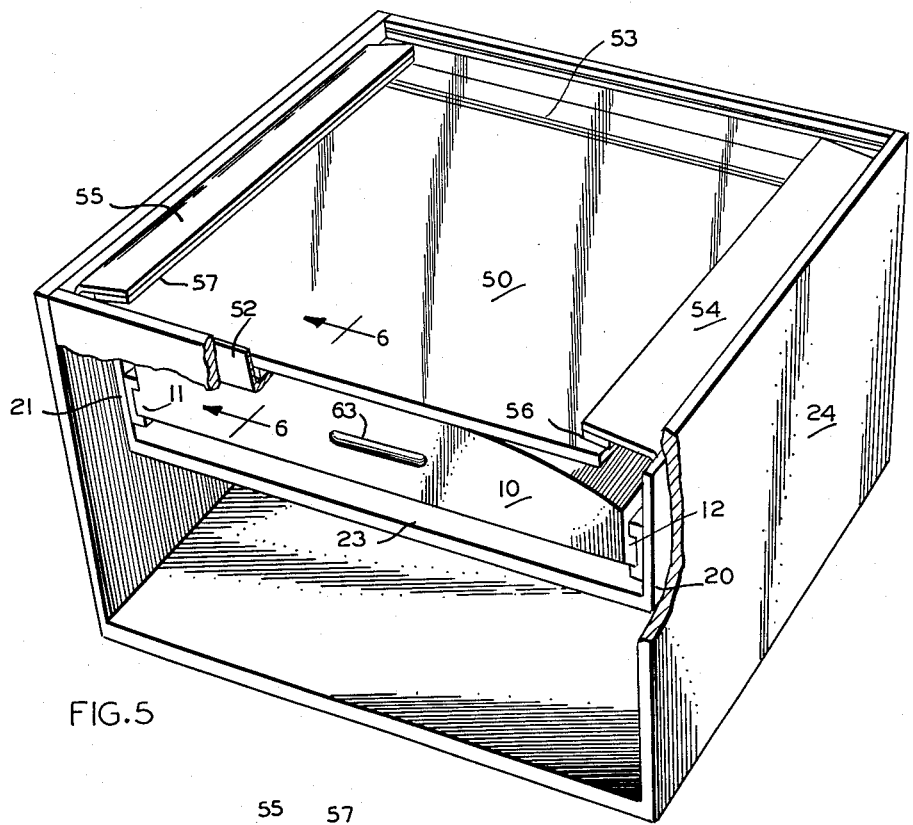
FIGURE 5, is a perspective view of the printing apparatus with the front wall and the lid removed so as to illustrate the mounting of the transparent plate.
Figure 6:
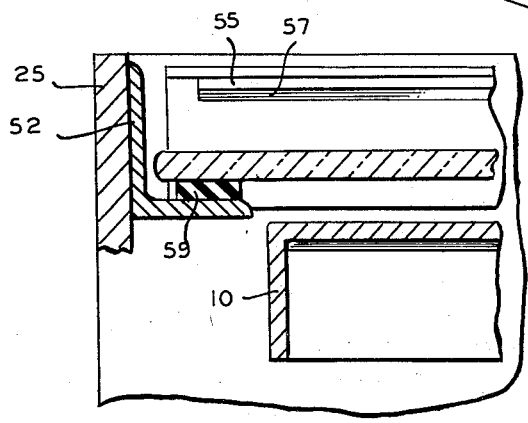
FIGURE 6, is a sectional view taken on lines A—A of FIGURE 5.

As will be seen from the illustrations and the detailed description of the component elements, the apparatus consists essentially of a printing frame in which a platen for the support of the sensitized material and the original to be reproduced has a curved surface preferably in the form of a true arc, i.e., a portion of the circumference of a circle, which by suitable power means may be raised to press against a flat transparent plate. The latter, preferably made of tempered glass, is so supported in the frame as to permit deformation thereof so as to be constrained to follow the curvature of the platen.

Referring to the drawings, in the views of FIGURES 1 and 2, it is seen that the platen 10 is mounted on slides 11 and 12 which fit between the slats 14, 15, 16 and 17, respectively, of the sides 20 and 21 of a carriage 22 so that it may be withdrawn as a drawer for the purpose of easy access as will be explained later.

The platen 10 may be made of metal or any suitable material which can be fabricated to have a smooth solid surface. It is also feasible to apply a glass plate having the required curvature to the platen 10 to obtain a hard and even surface.

Figure 7:
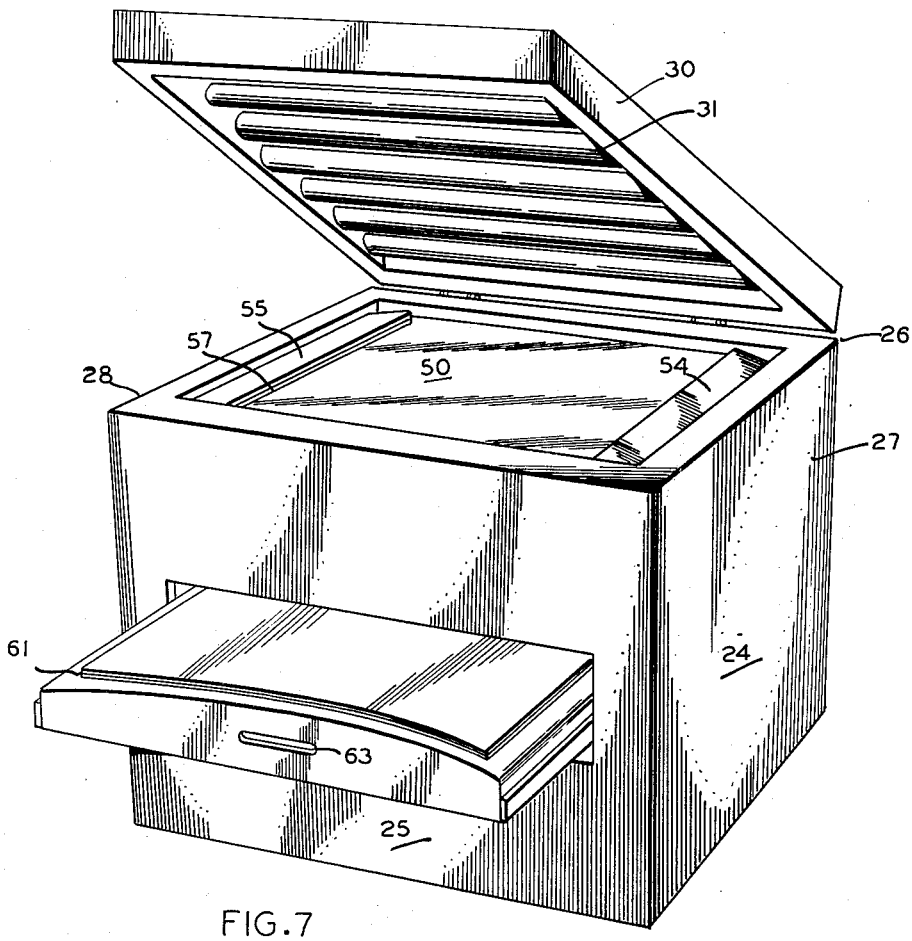
FIGURE 7, is a front elevational view in perspective of the printing apparatus with the platen pulled out and the lid opened.

The carriage 22 consists of a simple frame having sides 20 and 21 attached to a cross-member 23. The complete assembly is mounted in a suitable housing or cabinet 24 having front and rear walls 25 and 26 and side walls 27 and 28. This is seen in FIGURES 5 and 7. A lid 30 is hinged to the wall 26 supporting on its inner side a plurality of tubular discharge lamps 31 for the purpose of exposing the light sensitive material.

As seen in FIGURES 1 and 2, the carriage may be lifted by means of a jack 33 which may be of conventional construction such as a screw or a hydraulic type having a lifting rod 34 terminating in a locating pin 35. The latter fits into a bushing 36 extending downwardly from the center of the platen 10. The rod 34 has a sliding fit in the sleeve 37 imbedded in the cross-member 23. A collar 38 attached to the rod 34 abuts against the cross-member 23 and applies force for the raising of the carriage 22 and thereby effecting upward movement of the platen 10. Guide pins 40 and 41 mounted on brackets 42 and 43, respectively, attached to the inner walls of the cabinet 24 hold the carriage 22 against lateral displacement and tilting. The pins 40 and 41 have also a sliding fit in the sleeves 44 and 45, respectively, placed in the cross-member 23.

Disposed above the platen 10 and supported in the top portion of the cabinet 24 is the transparent plate 50. As mentioned before, this plate is preferably made of tempered glass, although certain plastic materials are also suitable for this purpose.

The plate 50 is freely supported resting on brackets 52 and 53 attached to the inner sides of the walls 25 and 26 of the cabinet 24. Upward movement of the plate 50 is restricted by the guides 54 and 55 attached to the sides 27 and 28 of the cabinet 24. Padding 56 on the underside of the guide 54 and a similar padding 57 underneath the guide 55, which may be of felt or similar material, are provided to protect the plate 50 against abrasion and to permit it to slide out when forced to bend by the lifting of platen 10. A soft material padding 59 is also provided on the brackets 52 and 53 on which the plate 50 freely rests.

The important feature of the present apparatus is the curved platen 10 and its coactive arrangement with the glass plate 50. As seen in FIGURES 1 to 4, the platen 10 supports the sensitized material 60 over which is placed the translucent original 61 to be reproduced. The latter may be of various types of material such as film, paper, silk, etc., and it may have various thicknesses. At times, the material to be copied may be of the type which wrinkles easily, for example, very thin film or it may be creased such as maps or documents which have been used and handled over considerable time. Whatever type of original is used, it will be flattened out evenly. This results from the curved surface of the platen 10 and the straight surface of the glass plate 50. As the platen 10 is raised, contact between the two surfaces is first established at a narrow line traversing the width of the platen 10. At the instant the two surfaces touch, there is a point of contact from which, as the platen 10 is progressively raised and constrained to bend, incremental areas of contact are established in the direction bilateral to the first line contact. The copy material 60 and the original 61 are thus held in pressure contact from the center line of the platen 10 and extending therefrom in both directions, the bending glass plate 50 smoothening out the original over the copy material in an even and continuous contact. Any creases or undulations of the original are ironed out and no air can become trapped between the glass plate 50 and the original 61. FIGURE 3 shows in cross-section the position of the moving platen at the instant point contact is established and FIGURE 4 illustrates the completed deformation of the glass plate around the curvature of the platen 10 with the original and copy material sandwiched therebetween.

The apparatus is simple to use. Loading is effected by pulling out the drawer-like platen 10 by means of the finger cutout 63 (FIGURE 7). After placing the material on the platen 10, it is reinserted in the cabinet 24 and power applied to the jack 33. When the platen is fully raised (FIGURE 2) the lid 30 is closed (FIGURE 7) and the lamps 31 energized for the time required to expose the sensitized material. Thereafter, the platen 10 is lowered and pulled out from the cabinet 24 for the removal of the original and copy material.

In a practical embodiment, use was made of a ¼ inch thick tempered glass plate, 25 inches wide and 41 inches long. The platen was made of wood and lined with glass so as to obtain a true parallel surface with the glass plate. The curvature of the platen represented a true arc and had a radius of 25 feet.

We claim:

1. Contact printing apparatus utilizing a translucent original and a light sensitive sheet material, including in combination, a housing, a curvilinear platen upon which said original in contact with the sensitized material is placed, a carriage supporting said platen, a flat transparent plate disposed above said platen, a frame for supporting said plate in said housing, power means for progressively lifting said carriage and thereby pressing said platen against said plate to the extent that said plate is constrained to follow the curvilinear surface configuration of said platen, the surface contact between said plate and said platen being thereby established from a central point progressively over the area thereof effecting a substantially creaseless and air-bubble free framing of said original and said light sensitive material, and a light source above said plate for exposing said material.

2. Contact printing apparatus utilizing a translucent original and a light sensitive sheet material, including in combination, a housing, a curvilinear platen upon which said original in contact with the sensitized material is placed, a carriage supporting said platen, a flat transparent plate disposed above said platen, a frame for supporting said plate in said housing, power means for progressively lifting said carriage and thereby pressing said platen against said plate to the extent that said plate is constrained to follow the curvilinear surface configuration of said platen, the surface contact between said plate and said platen being thereby established from a central point progressively over the area thereof effecting a substantially creaseless and air-bubble free framing of said original and said light sensitive material, a lid for said housing above said plate and a plurality of tubular discharge lamps for exposing said material mounted on the inner side of said lid.

3. Contact printing apparatus in accordance with claim 1 wherein said transparent plate is tempered glass.

4. Contact printing apparatus in accordance with claim 1 wherein said carriage is slideably supported and said housing has an opening through which said carriage may slide out for easy access in the placement of said original and light sensitive material.

5. Contact printing apparatus in accordance with claim 1 wherein said platen is rectangular and has a surface curvature representing a true arc, the surface thereof being lined with resilient material such as rubber.

References Cited in the file of this patent

UNITED STATES PATENTS

| | | |
|---|---|---|
| 497,691 | Shutting | May 16, 1893 |
| 1,338,894 | Younkin | May 4, 1920 |
| 1,804,739 | Brunk | May 12, 1931 |